(12) United States Patent
Bhatia et al.

(10) Patent No.: US 9,418,692 B2
(45) Date of Patent: *Aug. 16, 2016

(54) METHOD OF FABRICATING GRADED MEDIA

(71) Applicants: INTERNATIONAL BUSINESS MACHINES CORPORATION, Armonk, NY (US); National University of Singapore, Singapore (SG)

(72) Inventors: Charanjit Singh Bhatia, Singapore (SG); Koashal Kishor Mani Pandey, Singapore (SG); Nikita Gaur, Singapore (SG); Siegfried L. Maurer, Stormville, NY (US); Ronald W. Nunes, East Falmouth, MA (US)

(73) Assignees: INTERNATIONAL BUSINESS MACHINES CORPORATION, Armonk, NY (US); NATIONAL UNIVERSITY OF SINGAPORE, Singapore (SG)

( * ) Notice: Subject to any disclaimer, the term of this patent is extended or adjusted under 35 U.S.C. 154(b) by 47 days.

This patent is subject to a terminal disclaimer.

(21) Appl. No.: 14/510,580

(22) Filed: Oct. 9, 2014

(65) Prior Publication Data
US 2015/0118521 A1   Apr. 30, 2015

Related U.S. Application Data

(63) Continuation of application No. 13/982,987, filed as application No. PCT/SG2012/000028 on Jan. 31, 2012, now Pat. No. 8,900,730.

(60) Provisional application No. 61/438,133, filed on Jan. 31, 2011.

(51) Int. Cl.
G11B 5/66   (2006.01)
G11B 5/64   (2006.01)
G11B 5/65   (2006.01)

(52) U.S. Cl.
CPC ............... *G11B 5/645* (2013.01); *G11B 5/647* (2013.01); *G11B 5/65* (2013.01)

(58) Field of Classification Search
None
See application file for complete search history.

(56) References Cited

U.S. PATENT DOCUMENTS

2008/0299416 A1* 12/2008 Yoon .................. G11B 5/64
                                                                 428/827
2009/0068500 A1   3/2009 Kong et al.
2009/0244783 A1  10/2009 Shimizu et al.
2011/0299194 A1  12/2011 Aniya et al.

OTHER PUBLICATIONS

Abraham, C., et al. "Linear Decrease in the Magnetocrystalline Anisotropy" Physical Review, vol. 120, No. 5. Dec. 1960. pp. 1576-1579.

(Continued)

*Primary Examiner* — Holly Rickman
(74) *Attorney, Agent, or Firm* — Tutunjian & Bitetto; Louis J. Percello

(57) ABSTRACT

A magnetic data storage medium includes an ion doped magnetic recording layer having a continuous grading of coercivity or anisotropy. The medium also includes an ion-doped overcoat having an ion density that is at a maximum substantially at the interface with the recording layer and has a continuous grading of ion density between the overcoat and the recording layer. The coercivity is at a minimum substantially at the interface.

10 Claims, 4 Drawing Sheets

(56) References Cited

OTHER PUBLICATIONS

Bean, C., et al. "Superparamagnetism" Journal of Applied Physics, Volo. 30, No. 4. Apr. 1959. pp. 120S-129S.

Charap, S., et al. "Thermal Stability of Recorded Information at High Densities" IEEE Transactions on Magnetics, vol. 33, No. 1. Jan. 1997. pp. 978-983.

Chen, J., et al. "FEPT-C Graded Media for Ultra-High Denisty Magnetic Recording" Journal of Applied Physics, vol. 43, No. 18. May 2010. pp. 1-5.

Goll, D., et al. "Magnetic Properties of Exchange-Coupled L10-FEPT/FE Composite Elements" IEEE Transactions on Magnetics, vol. 44, No. 11. Nov. 2008. pp. 3472-3475.

Moser, A., et al. "Magnetic Recording: Advancing Into the Future" Journal of Applied Physics, vol. 35. Oct. 2002. pp. 157R-167R.

Piramanayagam, S. "Perpendicular Recording Media for Hard Disk Drives" Journal of Applied Physics, vol. 102, Issue 1. Jul. 2007. pp. 1-22.

Rottmayer, R., et al. "Heat-Assisted Magnetic Recording" IEEE Transactions on Magnetics, vol. 42, No. 10. Oct. 2006. pp. 2417-2421.

Suess, D., et al. "Exchange Spring Media for Perpendicular Recording" Applied Physics Letters, vol. 87, Issue 1. Jul. 2005. pp. 1-3.

Suess, D., et al. "Multilayer Exchange Spring Media for Magnetic Recording" Applied Physics Letters, vol. 89. Sep. 2006. pp. 1-3.

Victora, R., et al. "Composite Media for Perpendicular Magnetic Recording" IEEE Transactions on Magnetics, vol. 41, No. 2. Feb. 2005. pp. 537-542.

Zha, C., et al. "Continuously Graded Anisotropy in Singe (FE53PT47)100-XCUX Films" Applied Physics Letters, vol. 97, Issue 18. Nov. 2010. (4 Pages).

Zha, C., et al. "Gradient Ordered L10FEPTCU Films With Graded Anisotropy" 11th Joint MMM-Intermag Conference. Jun. 2010. p. 771.

"List of IBM Patents or Patent Applications Treated as Related".

\* cited by examiner

METHOD OF FABRICATING GRADED MEDIA

CROSS REFERENCE TO RELATED APPLICATIONS

This application is a Continuation of application Ser. No. 13/982,987, filed on Jul. 31, 2013, which is a national stage application of International Application No. PCT/SG12/00028, filed on Jan. 31, 2012.

FIELD OF THE INVENTION

This invention relates with manufacturing of magnetic recording media for hard disk drives with low switching field and high density storage capabilities.

BACKGROUND

A magnetic recording device such as hard disk drive would have the following key components: a recording medium to store information, a writing head to produce localized magnetic fields for writing information and a read sensor to convert the magnetic field from the media to electrical signals.

Each magnetic bit in the current perpendicular magnetic recording (PMR) medium comprises several thermally stable magnetic grains. Further increase in the areal density requires a reduction in the grain size to retain the signal-to-noise ratio.

However, the thermal stability factor ($K_u V/k_B T$, where $K_u$ is the magnetocrystalline anisotropy, V the magnetic grain volume, $k_B$ the Boltzmann constant and T the absolute temperature) of each magnetic grain should be >60.[1,2] Therefore, the reduction in the magnetic grain size reduces the thermal stability as a result of super-paramagnetism.[3]

Super-paramagnetism is a phenomenon by virtue of which magnetization direction of smaller magnetic particle switches without any applied magnetic field due to ambient thermal energy. In this case thermal energy ($k_B T$), becomes comparable to the anisotropy energy ($K_u V$) and magnetizations thermally flip the direction, which undesirably causes random data corruption. Putting another way, the magnetic grains lose the data undesirably without any applied field. Thus decreasing grain size is not by itself a solution to increasing areal density.

An alternative to delay the superparamagnetism is by using a material with large $K_u$ in order to keep the magnetic grains thermally stable, and hence the thermally stable bits. Prior art writing heads currently have a limitation of the maximum writing field of 24 kOe, and are unable to switch high $K_u$ mediums such as CoPt and FePt, since switching field is proportional to magnetocrystalline anisotropy. One of the key challenges for the realization of high $K_u$ materials based media for industrial application is to reduce the switching field.[4]

Exchange coupled composite (ECC) bilayer media[5] or exchange spring media[6] (independently proposed by Victora et al. and Suess et al., respectively) may be effective at reducing the switching field. Such medium consist of magnetically hard and soft regions within each magnetic grain, where soft region assists hard region to reduce the switching field by formation of domain wall at the opposite end of the hard\soft interface followed by domain wall propagation towards the interface (FIG. 1.). In addition to reducing the writing field, ECC media also enjoys other advantages over conventional perpendicular magnetic recording such as faster switching and insensitivity to wider range of easy axis distribution.

Furthermore it has been theoretically predicted and experimentally observed that multilayer media or "graded media" in which anisotropy varies substantially continuously along the film growth direction, may be more effective for switching field reduction than the bilayer ECC media.[7,8] However, preparing graded media is extremely challenging task using conventional sputtering technique. An approach to fabricate Fe/FePt graded media has been reported where Fe was deposited at high temperature on FePt, and composite film was annealed at high temperature.[9] In this case diffusion of Fe into FePt may produce graded media. However, major drawback of this technique is that the control of Fe diffusion is very difficult. Moreover, annealing may also induce grain growth in the lateral direction, which undesirably deteriorates the signal-to-noise ratio.

Another approach being used is introducing an impurity during sputtering into the layer to increase the magnetic softness of hard magnetic material. But this way there are different layers formed with reduced impurity content hence it is more of a multilayer medium rather than a continuously graded media.[10]

SUMMARY

In general terms the invention uses ion-implantation to achieve the graded media. The ions may be implanted into the recording layer in such a manner that the doping profile has its peak at the top surface of recording layer and a gradual tail goes deep into the recording layer hence creating a gradient in anisotropy across the recording layer.

In a first specific expression of the invention there is provided a magnetic data storage medium comprising: an ion doped magnetic recording layer having a continuous grading of coercivity or anisotropy, wherein the coercivity or anisotropy is at a minimum substantially at one side of the magnetic recording layer, and having substantial portion of maximum coercivity or anisotropy at the other side of the magnetic recording layer.

The magnetic recording layer may be a high magnetocrystalline anisotropy material.

The high magnetocrystalline anisotropy material may be selected from the group consisting or CoPt, FePt, $SmCo_5$ and any other magnetic materials comprising uniaxial magnetic anisotropy $>1 \times 10^7$ ergs/cc.

The continuous grading of coercivity or anisotropy may have a relatively sharp gradient profile at the interface of the overcoat and the recording layer, wherein an ion density is at a maximum substantially at the interface and the coercivity is a minimum substantially at the interface.

The ions may be selected from the group consisting of helium ($He^+$), ($C^+$), nitrogen ($N^{2+}$), argon ($Ar^+$), cobalt ($Co^+$), antimony ($Sb^+$) and any combination thereof.

The ions may be cobalt ($Co^+$).

The fluence of the ions may range from $10^{14}$ to $5 \times 10^{16}$ ions/cm$^2$.

In a second specific expression of the invention there is provided a method of fabricating a magnetic data storage medium comprising: providing a magnetic recording layer, and implanting ions into the magnetic recording layer to provide a continuous graded level of ion doping within the magnetic recording layer.

The step of implanting ions may comprise selecting a species of ions, an angle of implantation and an energy of implantation to achieve a maximum doping level substantially at one side of magnetic recording layer and having substantially undoped portion at the other side The species of ions may be selected from the group consisting of helium (He+), carbon (C+), nitrogen (N2+), argon (Ar+), cobalt (Co+), antimony (Sb+) and any combination thereof.

The method may further comprise selecting a fluence of the ions from between $10^{14}$ to $5 \times 10^{16}$ ions/cm$^2$.

BRIEF DESCRIPTION OF THE DRAWINGS

In order that the invention may be fully understood and readily put into practical effect there shall now be described by way of non-limitative example only, example embodiments described below with reference to the accompanying illustrative drawings in which.

DETAILED DESCRIPTION

According to the example embodiment it is proposed to fabricate a graded media using an ion-implantation method, which is described as follows.

1) Granular media of CoCrPt and FePt are deposited on Ru and CrRu underlayer respectively. The magnetic recording layer is a high magnetocrystalline anisotropy material and may comprise CoPt, SmCo$_5$, or any other magnetic materials having uniaxial magnetic anisotropy >$1 \times 10^7$ ergs/cc.

2) Ru and CrRu underlayer were chosen for high anisotropy CoCrPt and FePt magnetic recording layer, since it will control the easy axis of magnetization along the film normal direction required for perpendicular magnetic recording.

3) Magnetic recording layer is implanted with suitable ion species, dose and energy.

Figure 1:
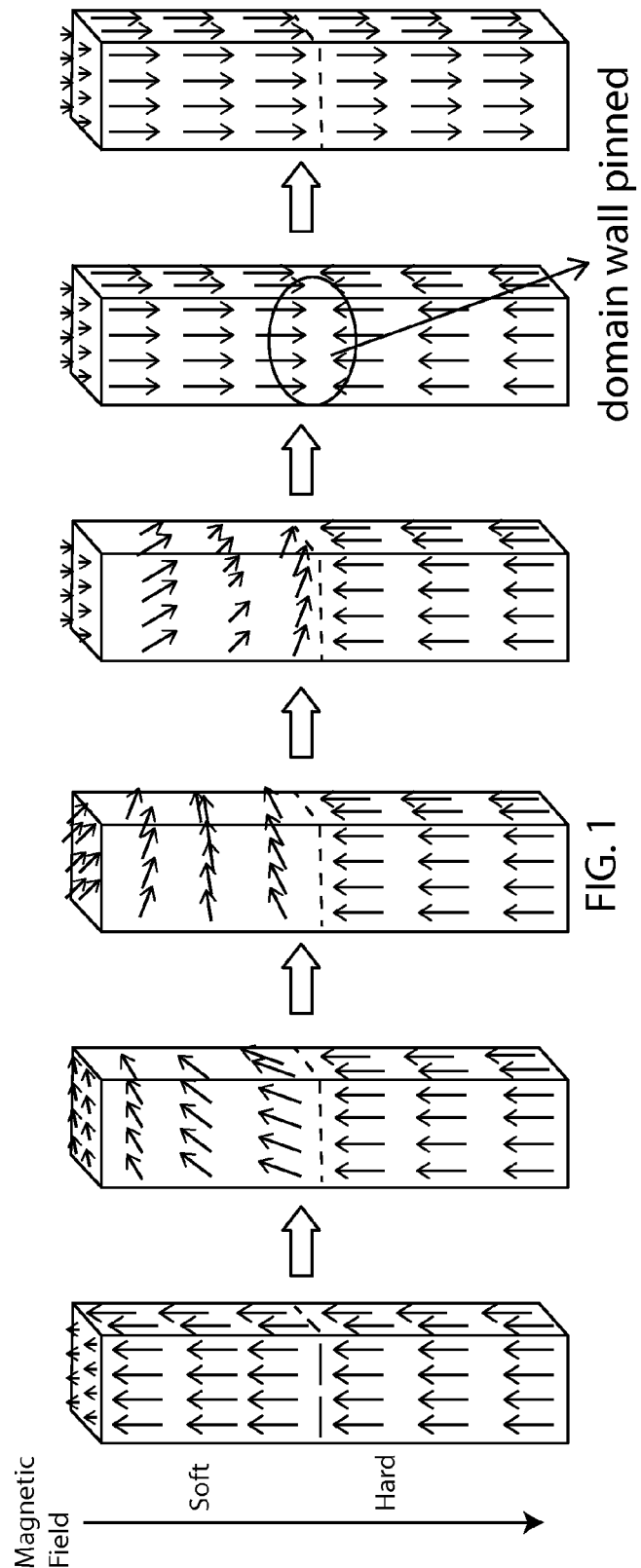
FIG. 1 is a schematic diagram of a field reversal in an ECC media using a spin chain model.
Figure 2A:
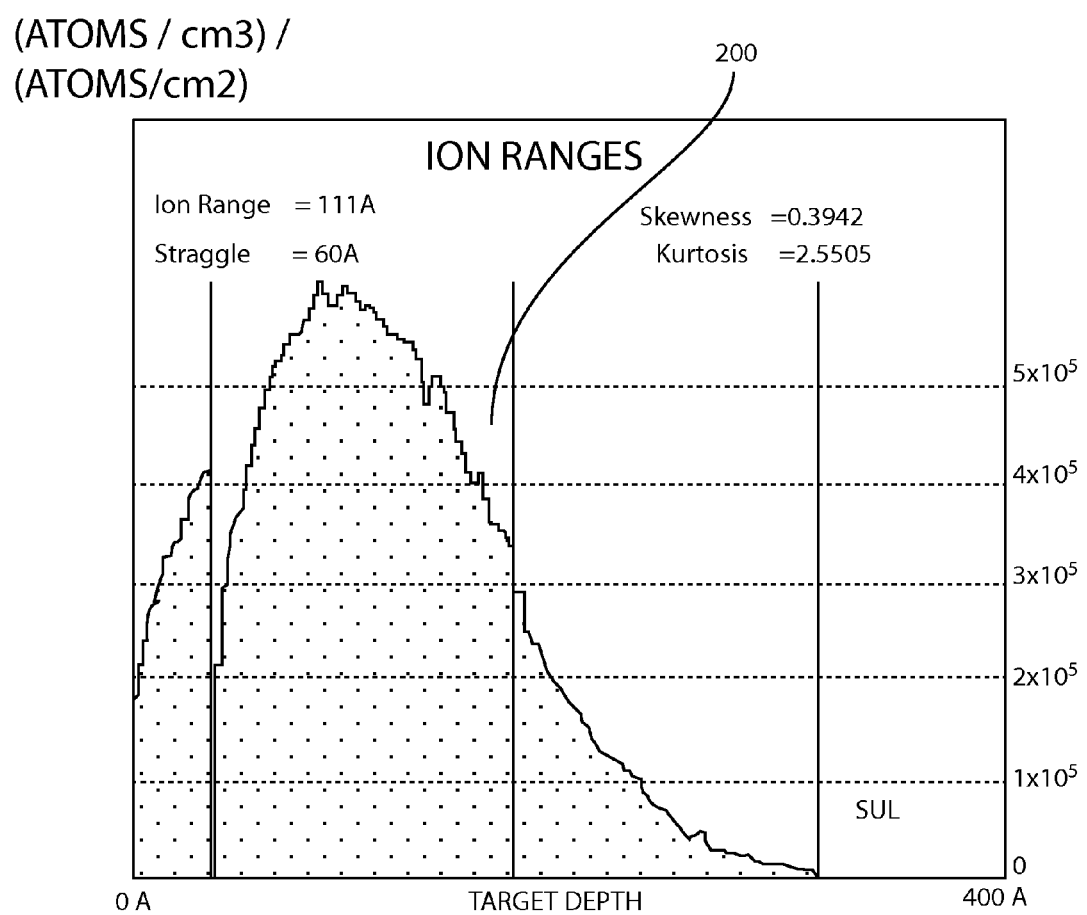
FIG. 2(a) is a graph of an ion implantation profile of carbon at 5.8 keV in the recording layer according to an example embodiment of the present invention.
Figure 2B:
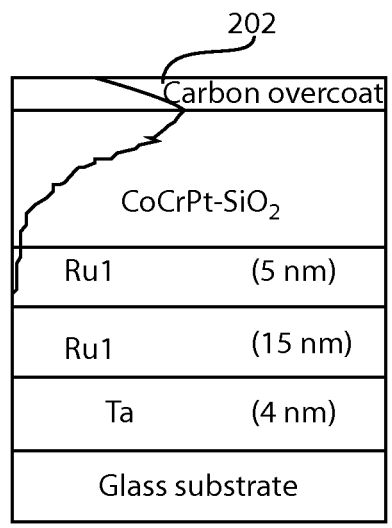
FIG. 2(b) is a graph of an ion implantation profile in a complete media structure.

4) Ion implantation results shows uniform Gaussian doping profile 200 inside the film (FIG. 2.(a)) and helps to implant the doping concentration in controlled way at different depth, which changes the magnetic anisotropy in very controlled way at atomic level. The implanted profile 202 in complete media structure is shown in FIG. 2. (b).

Figure 3:
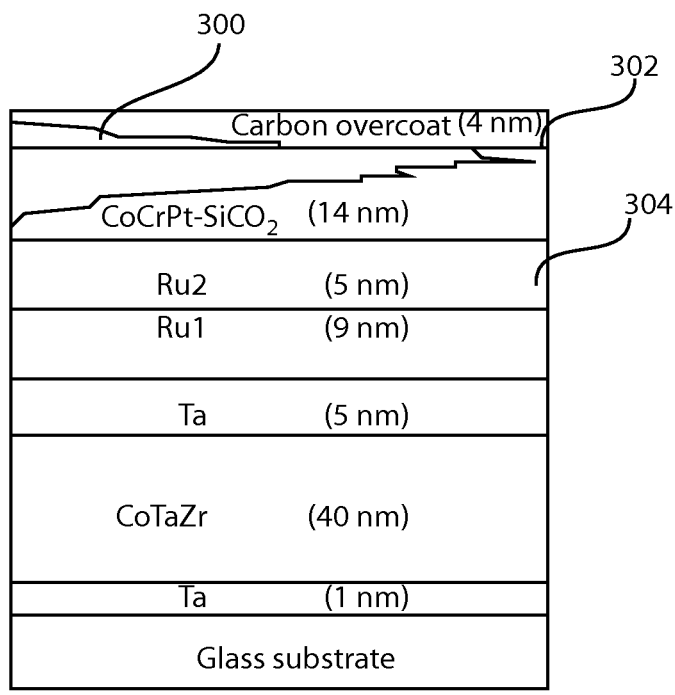
FIG. 3 is a schematic diagram of graded media by ion implantation.

5) Ideally, the profile 300 in media should be as shown in FIG. 3, such that a maximum doping happens on the surface of recording layer 302 and reduces as it goes below in recording layer 304. Such continuous change in magnetic anisotropy leads to fabricate the graded media precisely as shown in FIG. 3.

Figure 4:
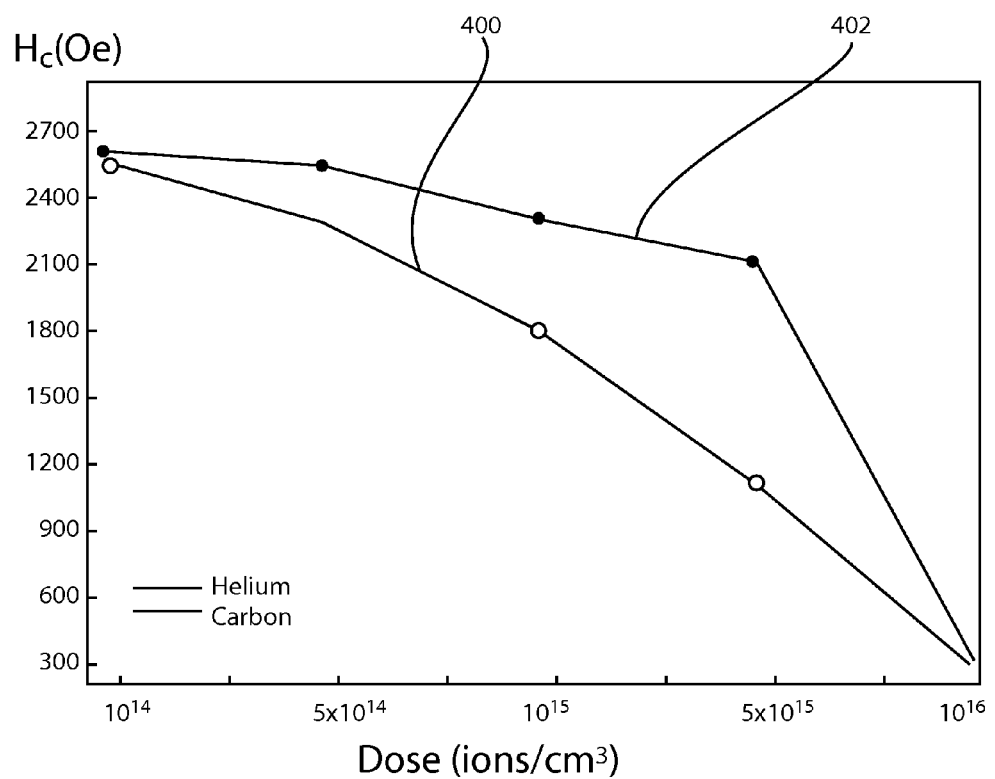
FIG. 4 is a graph of switching field verses dose for different implanted species.

6) Ion-implantation of Helium 400 and Carbon 402 (FIG. 4) in addition to other ions shows that coercivity is the function of implanted dose, energy and implanted species indicating that these are the parameters that tailor the magnetic properties.

The ion species chosen for the graded media application should preferably be able to reduce the anisotropy constant without changing the thermal stability of grains and remanent magnetization or saturation magnetization. Ion species which have been tried are helium (He+), carbon (C+), nitrogen (N2+), argon (Ar+), cobalt (Co+) and antimony (Sb+) starting with fluence ranging from $10^{14}$ up to $5 \times 10^{16}$ ions/cm$^2$. No change in Saturation magnetization ($M_S$) was observed for helium and cobalt, whereas, all other species showed reduction in $M_S$. The coercivity or anisotropy constant reduced with increasing fluence for a given species and the mass of ion species. Thermal stability factor was seen to be constant around 60 for nitrogen, oxygen and cobalt till a fluence of $5 \times 10^{15}$ ions/cm$^2$.

Ion species like cobalt may be preferred for some applications where a reduced anisotropy constant without adversely affecting the saturation magnetization and thermal stability of the grains, with increasing fluence, is desirable.

Ion implantation by adjusting the energy of the implanted ions in such a way that ion implantation peak is at the top surface of recording layer and a gradual tail goes deep into the recording layer a continuous gradient of anisotropy across the recording layer can be created. Due to precise control of the doping profile, ion implantation may be very uniform compared to other methods which have been used in the prior art for graded media fabrication.

Whilst there has been described in the foregoing description embodiments of the present invention, it will be understood by those skilled in the technology concerned that many variations in details of design, construction and/or operation may be made without departing from scope as claimed.

LIST OF REFERENCES

1. S. H. Charap, P. L. Lu and Y. He, IEEE Trans. Magn. 33, 978 (1997).
2. A. Moser, K. Takano, D. T. Margulies, M. Albrecht, Y. Sonobe, Y. Ikeda, S. H. Sun and E. E. Fullerton, J. Phys. D: Appl. Phys. 35, R(157) (2002).
3. C. P. Bean and J. D. Livingston, J. Appl. Phys. 40, 120S (1959).
4. Rottmayer et. al. IEEE Trans. Magn. 42, 10 (2006).
5. R. H. Victora and X. Shen, IEEE Trans. Magn. 41, 537 (2005).
6. D. Suess, T. Schrefl, S. Faehler, M. Kirschner, G. Hrkac, F. Dorfbauer and J. Fiedler, Appl. Phys. Lett. 87, 012504 (2005).
7. C. Abraham and A. Aharoni, Phys. Rev. 120, 1576 (1960).
8. D. Suess, Appl. Phys. Lett. 89, 113105 (2006).
9. Dagmar Goll, Achim Breitling, and Sebastian Macke, IEEE Trans. Magn., 44, 3472 (2008).
10. C. L. Zha, R. K. Dumas, Y. Y. Fang, V. Bonanni, J. Nogués, and Johan Åkerman, Appl. Phys. Lett. 97, 182504 (2010).

The invention claimed is:

1. A magnetic data storage medium comprising:
   an ion doped magnetic recording layer having a continuous grading of coercivity or anisotropy; and
   an ion-doped overcoat, wherein an ion density of the medium is at a maximum substantially at an interface with the recording layer and has a continuous grading of ion density between the overcoat and the recording layer, and wherein the coercivity of the magnetic recording layer is a minimum substantially at the interface.

2. The medium in claim 1 wherein the magnetic recording layer includes a high magnetocrystalline anisotropy material.

3. The medium in claim 2 wherein the high magnetocrystalline anisotropy material is selected from a group consisting of CoPt, FePt, SmCo5 and magnetic materials comprising uniaxial magnetic anisotropy >$1 \times 107$ ergs/cc.

4. The medium in claim 1 wherein the ions are selected from a group consisting of helium (He+), carbon (C+), nitrogen (N2+), argon (Ar+), cobalt (Co+), antimony (Sb+) and any combination thereof.

5. The medium in claim 1 wherein the ions include cobalt (Co+).

6. The medium in claim 1 wherein a fluence of the ions ranges from 1014 to 5×1016 ions/cm2.

7. A method of fabricating a magnetic data storage medium comprising:
- providing a magnetic recording layer,
- providing an overcoat layer on the recording layer, and
- implanting ions into the magnetic recording layer and the overcoat layer to provide a continuous graded level of ion doping across the interface between the overcoat and the recording layer.

8. The method in claim 7 wherein the step of implanting ions comprises selecting a species of ions, an angle of implantation and an energy of implantation to achieve a maximum doping level substantially at one side of magnetic recording layer and having a substantially undoped portion at the other side.

9. The method in claim 8 wherein the species of ions is selected from a group consisting of helium (He+), carbon (C+), nitrogen (N2+), argon (Ar+), cobalt (Co+), antimony (Sb+) and any combination thereof.

10. The method in claim 7 further comprising selecting a fluence of the ions from between 1014 to 5×1016 ions/cm2.

* * * * *